Dec. 12, 1933.                H. PFANNENSTIEHL                1,939,079
                        SOUND PICTURE REPRODUCING EQUIPMENT
                    Original Filed June 23, 1928    2 Sheets-Sheet 1
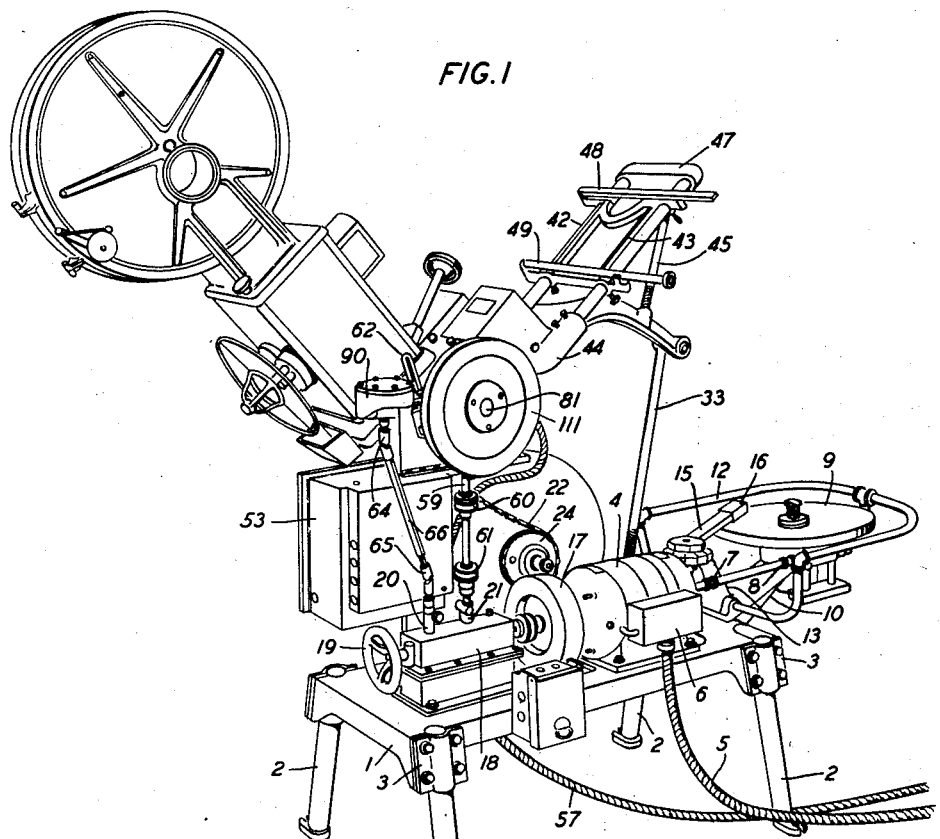
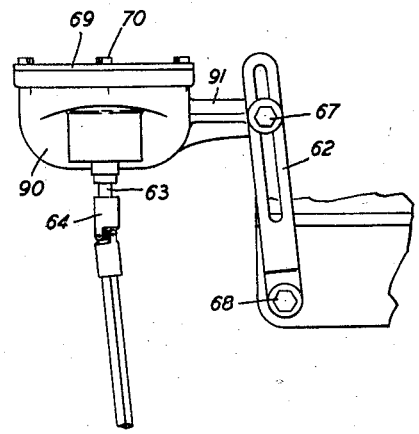
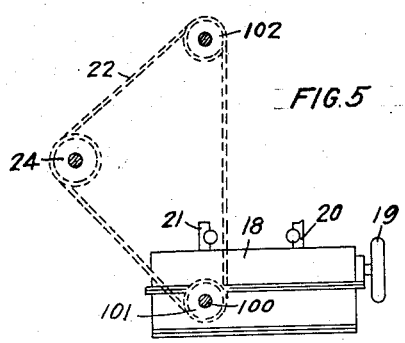
INVENTOR
H. PFANNENSTIEHL
BY
G. H. Heydt.
ATTORNEY Dec. 12, 1933.   H. PFANNENSTIEHL   1,939,079
SOUND PICTURE REPRODUCING EQUIPMENT
Original Filed June 23, 1928   2 Sheets-Sheet 2

INVENTOR
H. PFANNENSTIEHL
BY
G. N. Heydt
ATTORNEY

Patented Dec. 12, 1933

1,939,079

UNITED STATES PATENT OFFICE 1,939,079

SOUND PICTURE REPRODUCING EQUIPMENT

Harry Pfannenstiehl, Mountain Lakes, N. J., assignor to Bell Telephone Laboratories, Incorporated, New York, N. Y., a corporation of New York Original application June 23, 1928, Serial No. 287,731. Divided and this application June 14, 1932. Serial No. 617,143, and in Great Britain July 20, 1928

4 Claims. (Cl. 88—16.2)

This application is a division of my copending application Serial No. 287,731, filed June 23, 1928 entitled Driving mechanism, now issued as Patent Number 1,868,366.

This invention relates to sound picture projecting apparatus and more particularly to apparatus including both disc and film sound reproducing equipment and so arranged that various standard makes of picture projectors may be mounted thereon and used in conjunction with said sound reproducing equipment.

It is the object of this invention to provide apparatus of this kind which shall combine an efficient disposition of the various essential elements of such a mechanism with particular reference to simplicity of structure but without departure from the highest standards of operating quality.

More specifically, it is an object of this invention to provide a simple driving mechanism for the propelling agency of a film sound reproducing equipment in an apparatus of such nature that the film sound reproducing equipment is mounted in fixed relation to the picture projector and movable therewith throughout the range of projection angles. This driving mechanism is so constructed and so disposed that it is not affected by the particular projection angle chosen for any installation.

Viewed from a slightly different point it may be said that it is the object of this invention to provide on a base member a pivotally mounted superstructure, said superstructure being arranged to mount both a picture projector and a sound film reproducing device, with suitable driving arrangements for both projector and sound reproducing device, and so disposed that the projection angle may be varied at will without in any way affecting the driving mechanism for the sound reproducing device or making necessary any compensating adjustments therein.

A feature of the invention is found in an arrangement of mechanical parts such that the drive shaft of the sound reproducing equipment rotates on an axis coincidental with the pivotal axis of the cradle or supporting member on which the motion picture projector and sound reproducing devices are mounted.

A more complete understanding of the invention may be had from the following detailed description, reference being had to the accompanying drawings.

In the drawings, Fig. 1 is a perspective view of a motion picture projector equipped with sound reproducing devices arranged for synchronous operation therewith;

Fig. 2 is a perspective view of the base of the machine on which the motion picture projector may be mounted. This base shows the method of mounting various forms of sound reproducing equipment.

Fig. 3 is a view showing in detail the arrangement whereby the upper gear housing in which the driving link terminates may be rotated and clamped in proper position so that the end sections of the driving shaft may be maintained axially parallel.

Fig. 4 is a detailed view showing the manner in which the supporting cradle is mounted on the superstructure of the machine and shows the manner in which the drive shaft for the sound reproducing equipment is mounted with respect to this apparatus;

Fig. 5 shows the gear box and driving connection to the take-up reel as viewed from the side opposite to that shown in Fig. 1.

Referring now to Fig. 1, a general description of the apparatus will be given in order that the utility of the driving link may be more apparent. A bed plate 1 is mounted on four legs 2 secured to said bed plate by means of clamping saddles 3. A driving motor 4 is mounted on the bed plate and is supplied with power from a cable 5 which terminates in a connection box 6. The motor 4 drives a rearwardly extending shaft which is connected by means of flexible joints 7 and 8 to a phonograph turntable 9. Power is transmitted to the turntable 9 through a mechanical filter of known construction which tends to smooth out torque irregularities in the driving shaft. The turntable 9 is supported by bracket 10 which may be bolted to the bed 1 plate by means of bolts 11, one of which may be seen in Fig. 2. A guard rail 12 is suitably secured to the bracket 10 to protect the turntable 9 from interference. A standard 13 extends upwardly from bracket 10 and has mounted thereon a base 14 on which is pivoted an arm 15 to one end of which is connected an electrical phonograph reproducer 16. The phonograph equipment just described may be removed by the removal of bolts 11 and disconnection of the shaft to motor 4. It is, of course, obvious that the connections to the electrical phonograph reproducer must also be disconnected.

The motor 4 at its front end transmits power through a steadying flywheel 17 to a gear box 18. The main shaft driven by motor 4 extends through the gear box 18 and has secured thereto a hand wheel 19 by means of which the device may be turned over slowly by hand. The gear box 18 is provided with suitable gear connections so that vertical spindles 20 and 21 are rotated upon rotation of the motor. A third spindle 100 shown in Fig. 5, forms a horizontal shaft upon which a sprocket 101 is mounted to drive roller chain 22 which cooperates with the sprocket 24 of the friction clutch which drives the shaft on which the film take-up reel may be mounted. A third sprocket 102 may be used to operate a hold back sprocket of the projector if desired.

A magazine 27 is provided to house the take-up reel. The position of this magazine may be best seen in Fig. 2. The magazine is provided with a door 28 which may be opened by means of a handle 29. A window is provided by means of which a view of the interior of the magazine may be had when the machine is in motion. The magazine 27 consists of a rather rugged casting and includes a back plate which terminates at the forward edge in a double flange extending to either side. One of the flanges forms the forward side of the magazine. The magazine is bolted to the bed plate 1 at convenient points and in combination with the flanges just described serves as a mounting for other parts of the apparatus. A bracket 31 is bolted to the top of the magazine 27 and is provided in its upper forward portion 103 with suitable trunnions which support the pivoted superstructure or upper base which carries the projector head and film sound reproducing equipment.

The upper base consists of a frame with suitable trunnions to cooperate with a bushing carried by bracket portion 103. This construction may best be understood by reference to Fig. 4. The support 103 terminates in a cylindrical portion 104 in which is inserted bushing 105. The bushing is indicated by dotted lines. The upper base member which may be termed a cradle for supporting the projector and lamp housing has a portion 106 terminating in flanges suitably bored to permit bushing 105 to pass through them. These flanges 107 form in effect a clevis by means of which the superstructure may be rotated about the bushing 105 which passes through the bearing support 104. The film sound reproducing equipment indicated generally at 108 is secured to the superstructure by means of suitable screws 109. A sprocket 110 which is used for advancing the film through the sound reproducing apparatus is rigidly secured to a shaft 81 in any desired manner. The shaft 81 passes through the inner bearing surface of bushing 105 and is supported and guided thereby. A flywheel 111 is rigidly secured to shaft 81 at its alternate end. This flywheel is driven by means of a pinion 112 connected to it by means of a resilient coupling or mechanical filter. Since this coupling forms no part of the present invention, it will not be described and it has not been considered necessary to discuss it in detail. The pinion 112 is secured to a sleeve 113 which is freely rotatable about shaft 81 which forms a bearing for it. Pinion 112 is driven by means of a cooperating bevel pinion 114 secured to and driven by shaft 59. A curved operating member 32 forms a portion of the upper base or cradle and provides means whereby the projector head may be tilted to any desired angle. A bar 33 is arranged to slide through a clamping member 34 suitably trunnioned in the end of arm 32. The member 34 is arranged for rotation in its journals to allow for angular changes between the bar 33 and arm 32 when the upper base is raised or lowered. Set screws 35 and 36 serve to clamp the bar in adjusted position with respect to arm 32. The lower end of bar 33 is threaded into a nut which may be turned by means of a hand wheel 37. The hand wheel 37 and nut are rotatably mounted in a block 38 but are held against longitudinal motion therein. The block 38 is suitably trunnioned to standards 39 which are bolted to the bed plate 1. By means of the hand wheel 37 an exact tilting angle may be reached after the upper base has been brought into approximate position by simply lifting it into such approximate position and then clamping it by means of screws 35 and 36. In order to stabilize the machine and prevent any vibration which might occur in case the main pivot point became worn a secondary clamping device is provided. This clamping device is arranged to grip a sector 40 which forms a rear wall for bracket 31. A T-handle 41 rotates a threaded shaft and draws a threaded block against one edge of the sector 40 to firmly clamp the upper base in adjusted position.

Continuing the description of Fig. 2 it will be seen that a support for a projector arc lamp is provided in the rear of the upper base portion. This support consists of two tubular members 42 and 43 which are mounted in sockets 44 by means of clamping set screws. Support and rigidity is given to the support for the lamp by means of a brace 45 which is fitted at one end into a socket 46 on arm 32. The tubular members 42 and 43 are stiffened and held in alignment in the rear by means of a strap 47 into which they are secured by means of a socket and set screw arrangement. The supports for the arc lamp housing are adjustably mounted on rods 42 and 43 and are shown at 48 and 49.

The upper base portion is provided with compartments 50, 51 and 72 for housing various parts of the film sound reproducing equipment.

The sound reproducing equipment consists of a constant intensity lamp, an optical system by means of which a narrow band of light from said lamp is focused on the film as it passes an aperture plate and a photoelectric cell whose current output is varied in accordance with the film density variations. The lamp is housed in compartment 50 and its intensity may be regulated by means of a rheostat 71. The amount of current supplied to the lamp may be checked by means of a meter 52 mounted on the door of the compartment.

A glass door provides access to compartment 51, which houses the lens tube assembly whereby the narrow band of light is projected over the film. This compartment also houses the driving sprocket for imparting motion to the film, and various guide rollers. The photoelectric cell is housed in compartment 72 which is also provided with a door for convenient access thereto.

As was brought out in the previous description in connection with Fig. 4 the driving sprocket of the sound reproducing attachment is mounted on a shaft passing through the bushing which forms the axis on which the upper base portion may be rotated above the main base. It is therefore obvious that tilting the upper base portion has no effect on the drive for the film sound reproducing equipment since their axes are coincident.

A vacuum tube amplifier is mounted in the box 53 which is provided with a compartment door in which a switch handle 54 appears at a convenient point. A controlling rheostat for the amplifier is shown at 55 and a meter is indicated at 56. This amplifier is housed as a preliminary amplifier to provide amplification for the relatively feeble output of the photoelectric cell. It is necessary to provide this amplifier in order to bring the output of the photoelectric cell up to a point where it is comparable with the output of the phonograph reproducer 16. Electrical connections to the amplifier and sound reproducing equipment are brought to the machine by means of an armored cable containing a number of conductors. This cable is indicated at 57.

A pedal 58 is provided to control the starting and stopping of the machine. Lifting the pedal releases a brake shoe which cooperates with flywheel 17, Fig. 1, and at the same time operates an electric switch to close the circuits of motor 4. Depression of the pedal opens the circuit of motor 4 and continued movement downward applies the brake shoe to the outer surface of flywheel 17 to quickly slow down and stop the machine.

Referring now to Fig. 1 flywheel 111 is secured to the shaft 81 which drives the feed sprocket of the film sound reproducing device. This flywheel is driven through suitably damped springs by means of a spider which is turn is driven from the bevel gear arrangement previously described and actuated by vertical shaft 59. The shaft 59 is connected to vertical spindle 21 by means of suitable coupling members 60 and 61.

Fig. 1 shows a standard projector head mounted on the upper base portion. This projector head forms no part of the invention and will not be described in detail. It should be noted, however, that by means of suitable adapter plates any standard make of projector head may be secured to the upper base portion.

The driving mechanism for the projector heads is of such a nature that it may be adjusted to operate properly irrespective of the type of head used or of the tilting angle to which the upper base is set. A case 90 forms a housing for bevel gears one of which is secured to the main driving shaft of the projector head. The housing 90 is provided with an arm 91 which cooperates with a slotted link 62 suitably secured to the main frame to form a clamping device for maintaining the gear housing in adjusted position. The vertical shaft 63 which drives the bevel gears is connected with the vertical driving spindle 20 by means of two universal joints 64 and 65. These universal joints may be of any well known construction. In order to allow angular motion of the upper base portion or to compensate for variations in the location of the driving shaft of various types of projector heads the central portion 66 of the driving link is made extendible, and may telescope upon itself. As seen in Fig. 1 the shaft 66 comprises an outer sleeve portion and an inner driving portion each square in section they will rotate as one regardless of the extent to which shaft is extended.

As was previously pointed out the purpose of making the upper gear housing 90 pivotal about the axis of the driving shaft for the projector is to enable the end sections of the driving linkage to be maintained axially parallel so that the torque irregularities of one universal joint will neutralize the torque irregularities of the other. After the machine is set up and tilted to the desired angle the gear housing 60 is rotated about its axis until the end sections of the driving linkage are parallel. The housing is then clamped in adjusted position by means of set screws 67 and 68. The set screw 67 is threaded into arm 91 and set screw 68 is threaded into a convenient portion of the frame of the lower base portion. Inspection and adjustment of the upper bevel gears may be made by removing the housing cover 69 secured to housing 90 by means of screws 70.

What is claimed is:

1. In a combined motion picture projector and sound reproducing device, a base, a superstructure mounted thereon, a supporting cradle pivotally mounted on said superstructure by means of suitable bearings, a phonograph and driving motor mounted on said base together with said superstructure, a film sound reproducing equipment mounted on said cradle, a motion picture projector mounted on said sound reproducing equipment, a drive shaft for said sound reproducing equipment having an axis coincidental with the pivotal axis of said cradle, and mechanical driving connections from said motor to said phonograph, film sound reproducing equipment, and motion picture projector.

2. In a combined motion picture projector and sound reproducing device, a base, a superstructure mounted thereon, including a take-up reel housing as an integral portion thereof, a supporting cradle pivotally mounted on said superstructure by means of suitable bearings, a phonograph and a driving motor mounted on said base together with said superstructure, a film sound reproducing equipment mounted on said cradle, a motion picture projector mounted on said sound reproducing equipment, a lamp housing mounted on said cradle, a drive shaft for said sound reproducing equipment having an axis coincidental with the pivotal axis of said cradle and mechanical driving connections from said motor to said phonograph, film sound reproducing equipment, motion picture projector and take-up reel.

3. In a combined motion picture projector and sound reproducing device, a base, a superstructure mounted thereon including a take-up reel housing as an integral portion thereof, a supporting cradle pivotally mounted on said superstructure by means of suitable bearings, a phonograph and a driving motor mounted on said base together with said superstructure, a film sound reproducing equipment mounted on said cradle, said reproducer equipment including a photoelectric cell, a photoelectric cell amplifier mounted on said superstructure, a motion picture projector mounted on said sound reproducing equipment, a drive shaft for said sound reproducing equipment having an axis coincidental with the pivotal axis of said cradle, a gear transmission mounted on said base and connected to said motor, mechanical driving connections from said motor to said phonograph and to said gear transmission, and driving connections from said transmission to said motion picture projector, said film sound reproducing equipment and said take-up reel.

4. In a combined motion picture projector and sound reproducing device, a base, a superstructure mounted thereon, a supporting cradle pivotally mounted on said superstructure by means of suitable bearings, a phonograph and a driving motor mounted on said base together with said superstructure, a film sound reproducing equipment mounted on said cradle, means including suitable adapter plates to mount a motion picture projector of desired make on said sound reproducing equipment, a drive shaft for said sound reproducing equipment having an axis coincidental with the pivotal axis of said cradle, and mechanical driving connections from said motor to said phonograph, film sound reproducing equipment and motion picture projector.

HARRY PFANNENSTIEHL.